United States Patent
Yang et al.

(10) Patent No.: US 12,148,122 B2
(45) Date of Patent: Nov. 19, 2024

(54) PANORAMIC PRESENTATION METHODS AND APPARATUSES

(71) Applicant: SHENZHEN INSTITUTES OF ADVANCED TECHNOLOGY CHINESE ACADEMY OF SCIENCES, Guangdong (CN)

(72) Inventors: Qin Yang, Guangdong (CN); Pengfei Wei, Guangdong (CN); Liping Wang, Guangdong (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 342 days.

(21) Appl. No.: 17/729,890

(22) Filed: Apr. 26, 2022

(65) Prior Publication Data
US 2022/0253975 A1 Aug. 11, 2022

Related U.S. Application Data

(63) Continuation of application No. PCT/CN2020/134040, filed on Dec. 4, 2020.

(51) Int. Cl.
*G06T 3/4038* (2024.01)
*G03B 37/04* (2021.01)
(Continued)

(52) U.S. Cl.
CPC ............ *G06T 3/4038* (2013.01); *G03B 37/04* (2013.01); *G06T 3/047* (2024.01); *G06T 3/08* (2024.01)

(58) Field of Classification Search
CPC ......... G06T 3/4038; G06T 3/047; G06T 3/08; G03B 37/04; G03B 37/06
(Continued)

(56) References Cited

U.S. PATENT DOCUMENTS

2002/0196538 A1  12/2002  Lantz et al.
2007/0237420 A1*  10/2007  Steedly .................. G06V 10/24
                                                          382/284

(Continued)

FOREIGN PATENT DOCUMENTS

| CN | 109272478 A | 1/2019 |
| CN | 110211028 A | 9/2019 |
| WO | 2019155903 A1 | 8/2019 |

OTHER PUBLICATIONS

International Search Report of PCT/CN2020/134040.

*Primary Examiner* — Ali Bayat (57) ABSTRACT

The present invention provides a panoramic presentation method and apparatus. The present invention presents a panoramic image by using a combined structure of a single fisheye projector and a spherical screen in hardware, employs a geometrical relationship between a fisheye lens and the position of a viewer and isometric projection transformation, and enables 180° fisheye projection to present 720° environment information to the viewer in the center of the spherical screen, greatly simplifying the image conversion process and realizing zero distortion. According to a 720° panorama one-step generation method based on a single virtual camera in software, complex steps of collecting six images by a plurality of cameras, synthesizing a cube map and then converting the cube map into a panorama are not needed, the vertex position of a scene is directly adjusted in the process from a 3D space to a 2D image.

20 Claims, 4 Drawing Sheets

(51) Int. Cl.
*G06T 3/047* (2024.01)
*G06T 3/08* (2024.01)

(58) Field of Classification Search
USPC .......................................................... 382/284
See application file for complete search history.

(56) References Cited

U.S. PATENT DOCUMENTS

| 2016/0191879 A1* | 6/2016 | Howard | G06T 3/08 |
| | | | 348/745 |
| 2018/0101931 A1* | 4/2018 | Abbas | G06T 3/08 |
| 2019/0199897 A1* | 6/2019 | Momoki | H04N 23/54 |
| 2020/0068131 A1* | 2/2020 | Tadano | H04N 5/2628 |

* cited by examiner

PANORAMIC PRESENTATION METHODS AND APPARATUSES

CROSS-REFERENCE TO RELATED APPLICATION

This application is a bypass continuation application of PCT application no.: PCT/CN2020/134040. This application claims priority from PCT Application No. PCT/CN2020/134040, filed Dec. 4, 2020, the contents of which is incorporated herein in the entirety by reference

TECHNICAL FIELD

The present invention relates to the field of virtual reality, and in particular, to panoramic presentation methods and apparatuses.

BACKGROUND

Due to ethical factors, many neuroscience experiments cannot be carried out in human bodies, and brain research on small animals brings great help to technicians in exploring a brain function mechanism and opening up new fields of neurosciences. Behavioral experiments in neuroscience are often based on the free movement of animals in a specific space, such as a maze test for memory ability, a cross elevated test for exploratory behavior, a three-box apparatus test for social barriers and other international standard experimental paradigms. However, these behavioral experiments are difficult to further explain the neural principle. The interpretation of neural principle needs to be applied to many large-scale recording devices with fixed positions, e.g., two-photon microscopes, in vivo patch clamps, etc. These large-scale recording devices have excellent performances that are difficult to achieve by miniature animal-portable devices, such as wide recording range and high resolution, which are more conducive to thorough analysis of a neural network that mediates animal behavior. However, the use of large-scale recording devices with fixed positions to study the activities of animals in space has certain limitations, while Virtual Reality (VR) provides a possibility for position-fixed space roaming.

The virtual reality for humans is a head-mounted apparatus, which presents images with parallax in both eyes of a person to form a stereoscopic vision. Different from the horizontal-eyed animals such as humans whose eyes look forward, small animals such as mice and rabbits are lateral-eyed animals with two eyes located on both sides of the head, which makes the horizontal field of view of the small animals extremely wide, and the horizontal field of view of the mouse can reach 220°-230°. If such a wide field of view needs to be covered, a larger display screen is used near both sides of the head of the animal to present an image on a large screen that surrounds the animal, and animal virtual reality is applied to brain research. The experiment necessarily uses a variety of devices such as a microscope and a neural electrode in the brain. Therefore, head-mounted VR apparatuses for humans are not suitable for small animals.

There are two existing VR devices for small animals. One is to use a plurality of display screens to surround the small animals. At the same time, Tote the experimental operation, the distance between the display screens needs to be increased. Accordingly, the field of view occupied by a single display screen becomes smaller. Therefore, it is necessary to increase the number of display screens around the animal to cover the horizontal field of view of the small animal, and the continued increase in the number of display screens is limited by the computer's image manipulation capability. In addition, the field of view of small animals is mainly concentrated in the obliquely above, and the visual stimuli in some experiments are even displayed directly from above. Therefore, the virtual reality device assembled by a plurality of display screens arranged along the horizontal line cannot satisfy the requirements of the obliquely above field of view of small animals, and the experimental environment that simulates the real space structure cannot be presented. Moreover, when a plane image is displayed on an uneven medium, such as a plurality of display screens around small animals, the position and shape of each object in a three-dimensional space cannot be accurately mapped, and the virtual space presented may be distorted, and the viewer's sense of substitution or immersion is greatly reduced.

Another small animal VR apparatus, which is more commonly used, uses a spherical screen to surround the small animal, and a projector projects images on the spherical screen that surrounds the mouse. There are two main types of projection light paths. One is to dispose the projector behind and above the small animal, and the projector image is reflected to the spherical screen through a plane mirror and a convex mirror; the other is to move the projector under the front of the small animal. The projected image is reflected by a single convex mirror onto the spherical screen to facilitate instrument placement and experimental operation above and diagonally behind the head of the mouse. However, the existing technology is limited by a light path device and a projection light path, and the vertical projection field of view is small. The known vertical projection field of view is only about −20° to 60° at the maximum, which cannot satisfy the partial nerve research of visual stimulation of small animals from above. Moreover, the virtual reality image projected by the above method has significant distortion.

In addition, people and animals have fast moving vision, and thus the projected image delay may cause discomfort to the viewer. To increase the speed of image generation, it is necessary to increase the refresh rate of the display screen and the projector, which may greatly increase the burden of image operation. To satisfy the requirements of image generation speed, the existing technology reduces the burden of image operation by reducing virtual scenes. The virtual reality projection of small animals using this method is simplified to show the experimental environment with points, lines and planes. This experimental environment is too abstract and difficult for animals to understand. It requires a lot of time and labor costs to train animals before formal experiments.

In conclusion, the existing virtual reality technology is not suitable for small animal brain research in terms of field of view, image distortion, and generation speed, so it is necessary to improve the existing technology.

SUMMARY

The present invention provides a panorama presentation method for solving at least one of the problems in the prior art, such as large image distortion, slow image conversion speed, and small vertical field of view. The method includes the following steps:

step S1, constructing a projection structure;

the projection structure includes a projector and a spherical screen, the projector is equipped with a fisheye lens, the projector is disposed on the spherical screen, and the fisheye lens is tangent to the spherical screen and faces a center of sphere of the spherical screen;

step S2, according to a projection formula of the fisheye lens used, such as isometric projection, changing a content of projection transformation in virtual reality software, and bringing all scenes in a virtual space into a field of view of a virtual camera to generate a 720° panorama, the 720° panorama being a 2D panorama; and step S3, projecting the 2D panorama through the fisheye lens, where the viewer is located at the center of sphere of the spherical screen, and the 2D panorama forms a stereoscopic space on the spherical screen.

Furthermore, the projection transformation includes adjusting scene coordinates and a projection matrix according to an isometric imaging formula.

Furthermore, step S2 further includes: adjusting frustum culling and changing shadow transformation.

Furthermore, an isometric imaging formula is $d=n*\theta$, where d is a distance from the position of an object on a 2D plane image to the image center, n is a distance from an imaging plane to the virtual camera, and $\theta$ is an object vector angle, that is, an angle between a line connecting the object and the virtual camera and the z-axis, the z-axis represents an orientation of the virtual camera, the virtual camera represents the viewer's eyes, and the direction of the virtual camera is the same as the installation direction of the projector.

Furthermore, the adjusting scene coordinates includes the following steps:

$x1=x0*\theta*\sec\theta;$ $y1=y0*\theta*\sec\theta;$ $z1=\sqrt{(x0^2+y0^2+z0^2)};$ where $\theta$ is an object vector angle, that is, an angle between a line connecting the object and the virtual camera and the z-axis, and the z-axis represents an orientation of the virtual camera.

Furthermore, the projection matrix is:
[1/($\pi$+A),0,0,0,
0,1/$\pi$, 0,0,
0,0,−(f+n)/(f−n),−2*n*f/(f−n)
0,0,−1,0]

where A is an image aspect ratio of the projector, n is the closest distance between a visible object and the virtual camera, and f is the farthest distance between the visible object and the virtual camera.

Furthermore, the adjusting frustum culling includes the following steps:

moving the scene to the front of the virtual camera by a distance f for frustum culling; and moving the scene subjected to the frustum culling by the distance f in a direction towards the virtual camera;

f is the farthest distance between the visible object and the virtual camera.

Furthermore, the shadow transformation adjusts the scene coordinates according to the steps of claim 5 to generate a shadow.

A panoramic presentation apparatus, including:
a receiving unit, including a spherical screen;
a projecting unit, including a projector equipped with a fisheye lens, the projector being located at the edge of the spherical screen and the fisheye lens directly facing a center of sphere of the spherical screen; and an image processing unit, configured to convert an obtained 3D scene model into a panoramic plane image suitable for the projecting unit and the receiving unit, and project the panoramic plane image onto the receiving unit through the projecting unit, where the image processing unit applies the panorama presentation method according to any one of claims 1 to 8.

A computer readable storage medium, having a computer program stored thereon, where when the computer program is executed by a processor, the panoramic presentation method according to any one of claims 1 to 8 is implemented.

The present invention has at least the following beneficial effects: the present invention projects the image onto the entire spherical surface, and the horizontal and vertical fields of view are both 360°.

Through the projection formula of the fisheye lens used, such as isometric projection, the environment image is evenly distributed on the spherical surface, and the position of each site of the image is consistent with the orientation of the real environment, and theoretically zero distortion.

Different from the plane imaging of an ordinary lens, the fisheye lens is spherical imaging, which may preserve information of a hemisphere completely and without distortion. The projector and the spherical screen have a specific geometrical relationship, and thus the distortion of a combination of the fisheye projection and the spherical screen may be regarded as zero.

For the existing virtual reality projection light path, if the projected image is generated, software is required to reconstruct the light path to obtain a mathematical relationship before and after image deformation. Different regions of the image often have different mathematical relationships, and each point of the image needs to choose a suitable mathematical formula, so that the image generation speed is slow. However, the present invention adopts a uniform isometric transformation, a point-by-point judgment process is not required, greatly improving the image generation speed. Moreover, the present invention only changes one step in the image generation process to directly generate a panorama, without the complicated steps of generating six images, synthesizing a cube map, and then additionally converting same into a panorama, and the speed is at least 6 times higher than that of the previous cube map method.

Compared with the simple and abstract images of similar laboratories and commercial devices, the image simulation of the present invention is natural and rich in content.

The existing small animal virtual reality device adopts a plane mirror with a diameter of 15 cm and a special convex mirror-angle magnifying lens. The manufacturing cost of the mirror surface is high, and maintenance is troublesome in an experimental environment where animals lose hair and excrement a lot, and its aluminum material is soft and easily damaged. In the present invention, there is no intermediate reflection mirror, and only a fisheye projector is required, which reduces the manufacturing and maintenance costs.

BRIEF DESCRIPTION OF THE DRAWINGS

The present invention is described in further detail below with reference to the accompanying drawings and specific embodiments.

In the drawings: 1—spherical screen, 2—projector.

DETAILED DESCRIPTION

To make the objective, technical solution, and advantages of the present invention clearer, the following further describes the present invention in detail with reference to the accompanying drawings and embodiments. It should be understood that the specific embodiments described herein are merely used for explaining the present invention but are not intended to limit the present invention.

The horizontal field of view of the prior art is 270°, which is greater than that of small animals, and the maximum vertical projection field of view is only −20° to 60°, which cannot satisfy partial neural studies with visual stimulation to mice from above. To expand the vertical field of view of the virtual reality of small animals, the present invention selects a projector 2 with replaceable lens, replaces an ordinary medium telephoto lens with a fisheye lens, and forms a projection structure with a spherical screen 1 without providing any reflective lens. The spherical screen 1 used in the present invention is of a true spherical shape. To facilitate the experimental operation, the bottom and rear of ¼ of the spherical screen are generally cut off. The present invention selects a fisheye lens with a projection angle of 180°. The fisheye lens is disposed on the edge of the spherical screen 1, is tangent to the spherical screen and faces the center of sphere, and the small animal watching the image is located at the center of sphere of the spherical screen 1. According to the geometrical relationship that a central angle is twice a circumference angle, the image displayed by the fisheye lens may be a complete spherical surface, covering the entire spherical screen 1 to solve the problem in the prior art of narrow vertical projection field of view.

The projector 2 needs to display a complete spherical image on spherical screen 1, and the projector 2 projects a plane image, so the image needs to be transformed into a panorama containing all the contents of the environment, so that the projected image forms a correctly positioned and shaped visual space around the small animal.

The Image Needs to be Transformed into an Isometric Image

Figure 1A:
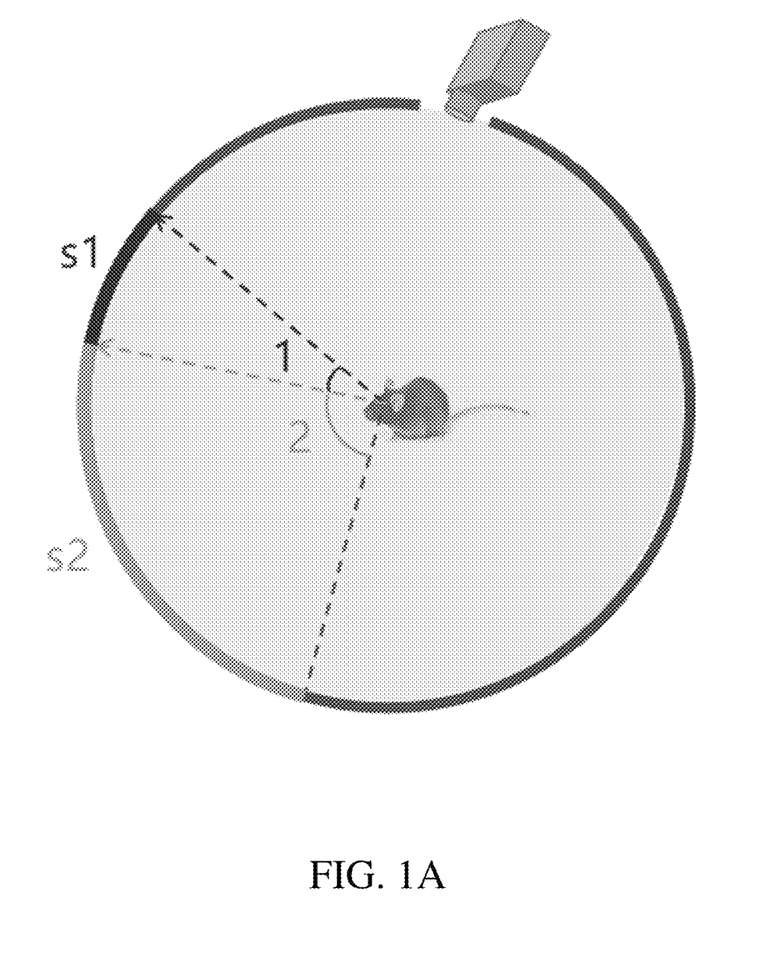
FIGS. 1A-1C are schematic diagrams of a transformation derivation process of a projection image of a fisheye lens of the present invention.
Figure 1B:
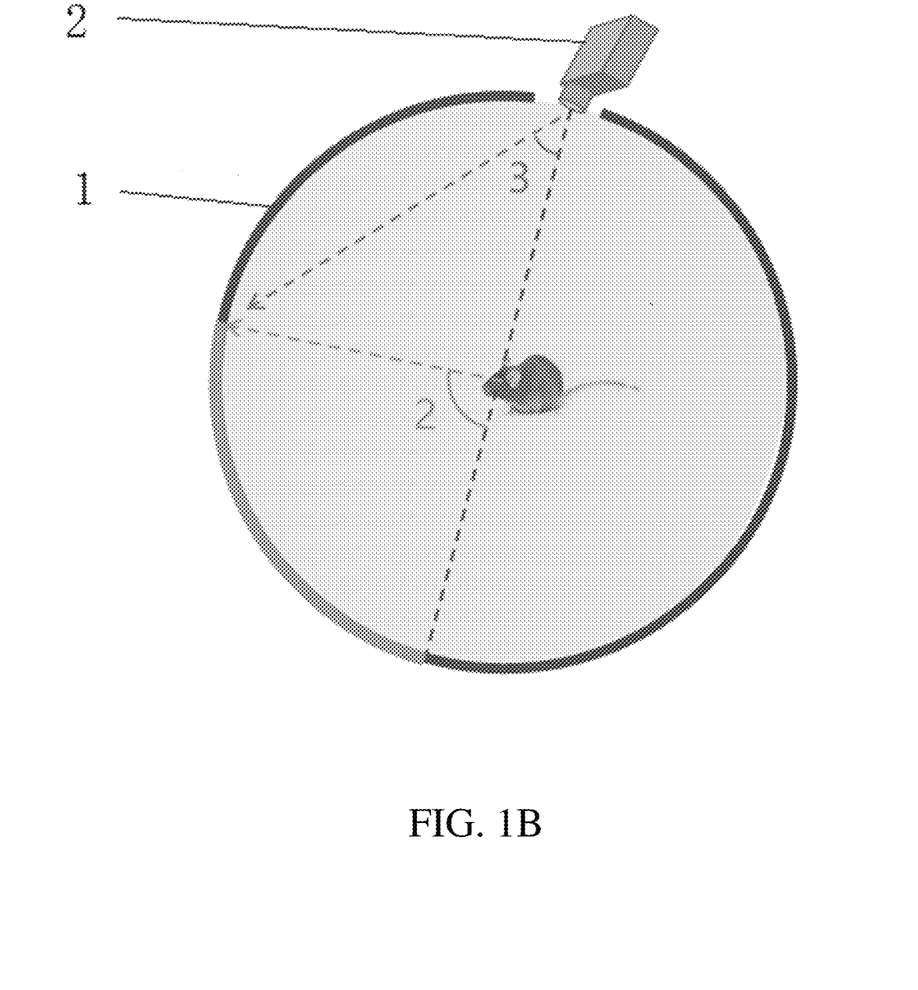
Figure 1C:
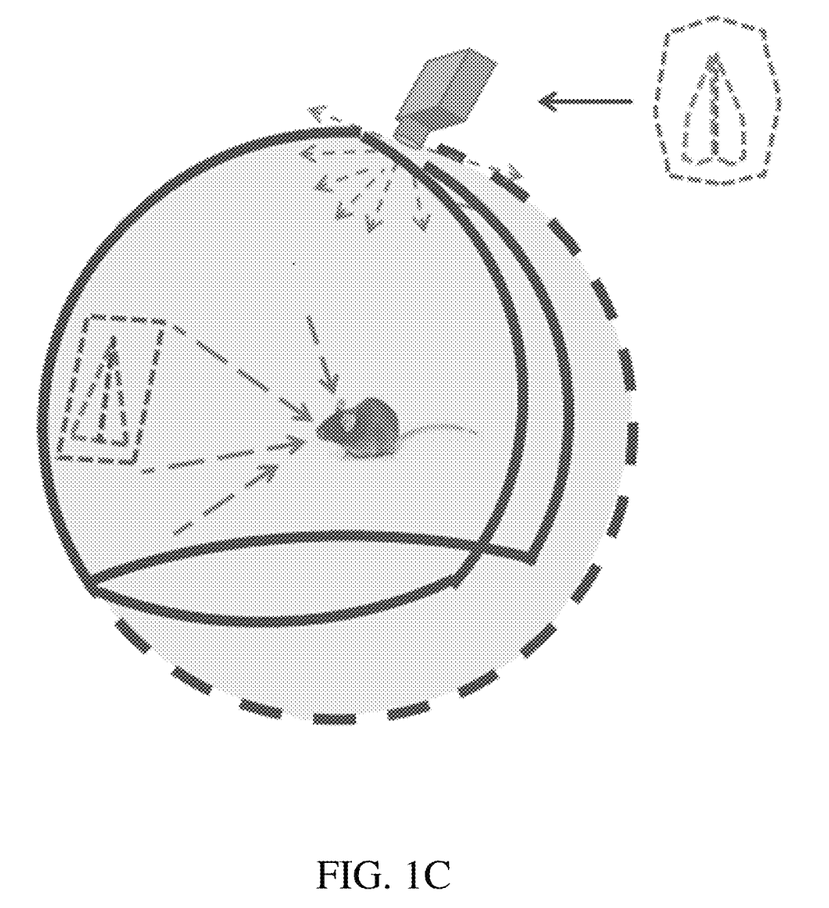

The small animal is located at the center of sphere of the spherical screen 1, and the images viewed on the spherical screen 1 have an isometric relationship, so the projector 2 needs to project an isometric image. Most of civilian fisheye lenses are designed and manufactured according to the isometric projection model, so the image projected by the fisheye lens is an isometric image. FIGS. 1A-1C shows a transformation derivation process of the projection image of the fisheye lens. In FIG. 1A, the small animal as a viewer is located at the center of sphere, and the size of the scene on the spherical screen 1 seen is proportional to its viewing angle, as shown in FIG. 1A, $\angle 1/s1 = \angle 2/s2$, such an imaging method is called isometric or equiangular projection. In FIG. 1B, the fisheye lens is located at the edge of the spherical screen 1 and is tangent to the spherical screen 1. There is a 1:2 relationship between a circumference angle $\angle 3$ and a central angle $\angle 2$, that is, $\angle 2 = 2\angle 3$. The image projected by the fisheye lens at 180° corresponds to the 360° environment in any direction from the point of view of the animal at the center of sphere, which is a 720° panorama with 360° horizontal and vertical fields of view. The isometric image seen by the small animal in FIG. 1C is obtained after the isometric projection of the projector 1 is proportionally transformed by the central/circumference angle, and still has an isometric (equiangular) relationship.

The present invention replaces the lens and the reflected light path of the projector 2 in the prior art with the fisheye lens, thereby expanding the vertical field of view of the projected image. The present invention evenly distributes the image on the spherical surface by isometric projection, so that the position of each site on the image is consistent with the orientation of the real environment, and is different from the plane imaging of the ordinary lens, the fisheye lens is spherical imaging, and may save the environmental information completely and without distortion. The projector and the spherical screen have a specific geometrical relationship, to achieve zero distortion of the projected image on the spherical screen. In addition to the isometric transformation, the present invention does not require any other distortion correction process. The combined isometric imaging structure of the fisheye lens and the spherical screen 1 combines a multiple relationship between the central angle and the circumference angle to jointly realize the isometric panoramic transformation of the image, which greatly simplifies the image transformation process and improves the image conversion speed.

It is to be noted that the 720° panorama of the present invention includes 360° horizontal and vertical fields of view, that is, all the information visible in the environment, while the 360° panorama commonly used in life is a horizontal 360° panorama taken by holding the camera and turning around in place, which may be regarded as an unfolded cylindrical image, excluding the sky directly above and the ground directly below.

The 3D Virtual Space Generates a Panorama in One Step

The content above introduces that the hardware innovation of the present invention solves the problems of small vertical field of view of the projected image, image distortion, and slow image conversion speed. The present invention improves a panorama generation method on the software of the prior art, and further improves the image conversion speed.

The existing panorama generation method generally uses a cube map, that is, six cameras facing each side of the cube take pictures respectively, or one camera takes pictures along the x, −x, y, −y, z, and −z axes respectively, a total of six images are combined into a cube map, which is transmitted to a main virtual camera representing the eye and converted into a panorama. The panorama generation speed is slow, and if the environment changes are to be reflected all the time, it may cause lag in the generation of virtual reality space video and interactive response.

Figure 2:
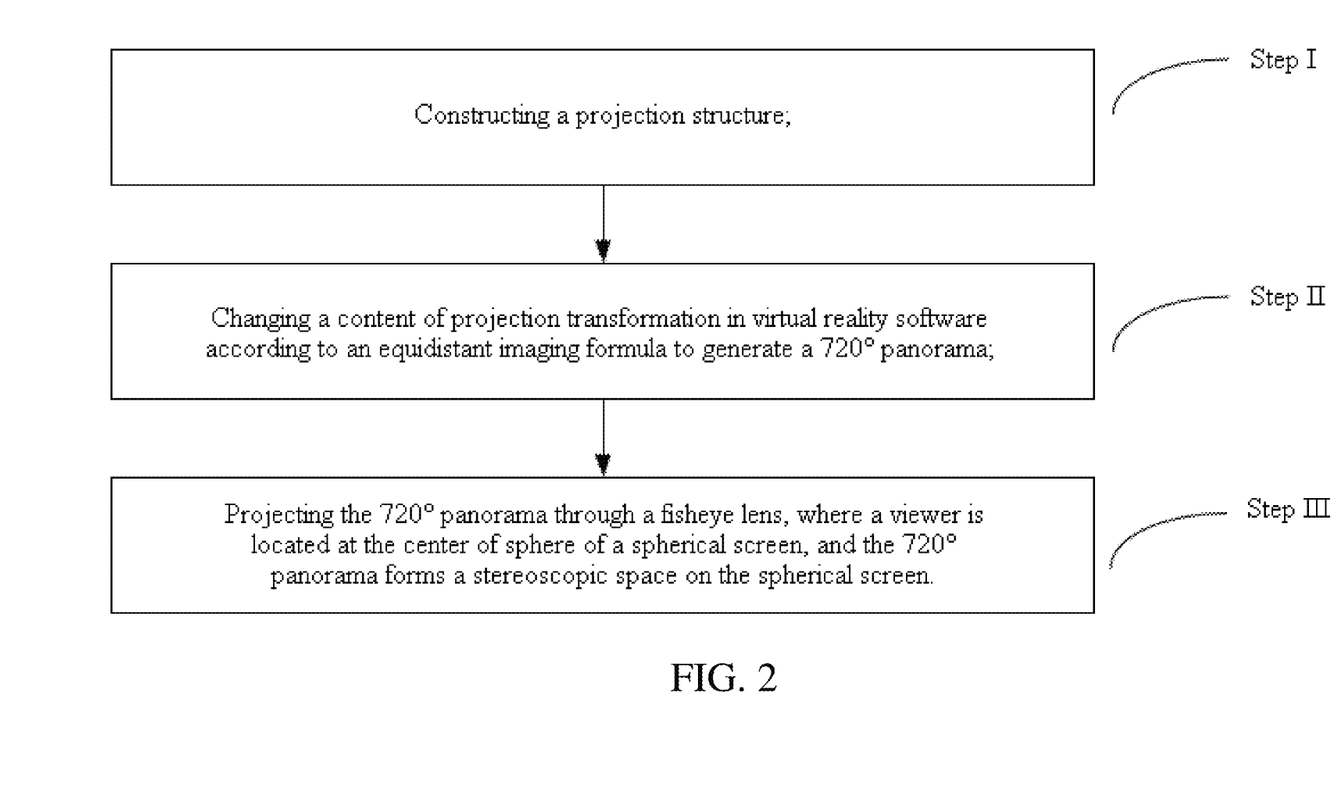
FIG. 2 is a flow block diagram of a 3D object generating a 2D plane image.

The present invention may directly generate a panorama by intervening in the middle process of generating a picture without going through the cube map conversion, which saves a lot of time. The core step of converting the 3D space into the 2D plane image in virtual reality software is projection transformation. Therefore, the present invention intervenes in the projection transformation step.

Specific intervention operations include the following steps.

First, the direction setting of the virtual camera needs to be the same as the installation direction of the projector 2.

Then, all the scenes in the scene are included, and the original projection transformation is changed by using the isometric imaging formula. The isometric imaging formula is $d = n*\theta$, where d is a distance from the position of the object on the plane image to the center of the image, n is a distance from the imaging plane to the camera, and $\theta$ is an object vector angle, that is, an angle between a line connecting the object and the camera and the z-axis, and the z-axis represents an orientation of the camera.

The coordinates of each scene in the 3D space before projection transformation are known, and the coordinates of each scene in the panorama after projection transformation may be calculated through the isometric imaging formula. However, to satisfy special requirements of virtual reality software for homogeneous coordinates, depth judgment, etc., and to connect with the upstream and downstream processes of the projection transformation, the present invention adjusts the projection transformation in the original process according to the characteristics of the projection transformation. The original projection transformation only requires one projection matrix, but the projection matrix can only translate, rotate, and scale, and cannot complete other complex changes. The adjusted projection transformation of the present invention includes two parts: adjustment of scene coordinates and a projection matrix. Details are as follows:

The 3D coordinates are adjusted to:

$$x1 = x0 * \theta * \sec\theta;$$

$$y1 = y0 * \theta * \sec\theta;$$

$$z1 = \sqrt{(x0^2 + y0^2 + z0^2)};$$

The projection matrix is adjusted to:
[1/(π*A),0,0,0,
0,1/π,0,0,
0,0,−(f+n)/(f−n),−2*n*f/(f−n)
0,0,−1,0]

where A is an image aspect ratio of the projector, n is the closest distance of the visible object, and f is the farthest distance of the visible object.

By changing the specific steps of projection conversion in the original process with the above method, an equidistantly distributed 720° panoramic image may be directly generated, without using the cube map method, which greatly shortens the generation speed of the panoramic image. To better achieve panoramic imaging, the following two aspects are adjusted.

1. To prevent a scene behind the virtual camera from being cut off, the frustum removal step of the virtual reality software is changed. Since this step cannot be deleted in panoramic imaging, the specific adjustment steps are as follows: before the frustum culling, all the scenes move forward along the z-axis by a distance f, and after the frustum culling, all the scenes move back by a distance f.

2. Since the shadow generation process and the scene image generation process are independent of each other, shadow transformation adjusts the scene coordinates according to the 3D coordinate adjustment method in the foregoing projection transformation to generate shadows.

Because a main control program of the virtual reality software is performed in a CPU, and some graphics operations are performed in the GPU, in order to be compatible with a graphics programming interface, the foregoing projection matrix is changed in the CPU through a virtual reality software script, and the 3D coordinates are changed in the GPU through a shader program of the virtual reality software. The above changes are applicable to an OpenGL graphics programming interface. If other graphics programming interfaces such as DirectX are used, the corresponding plus-minus signs and parameters need to be changed according to coordinate definitions.

In addition, the present invention also provides another embodiment, which is different from the above embodiment in that two back-to-back cameras are disposed to capture images of two hemispheres respectively, and then the two images are combined into one image and transmitted to a main virtual camera representing the eyes. The panorama may also be displayed directly after the parameter adjustment through the dual-camera display function of the virtual reality software.

The present invention also provides a panoramic presentation apparatus, including a receiving unit, a projecting unit, and an image processing unit.

The receiving unit includes a spherical screen 1.

The projecting unit includes a projector 2 equipped with a fisheye lens. The projector 2 is located at the edge of the spherical screen 1 and the fisheye lens directly faces the center of sphere of the spherical screen 1.

The image processing unit is configured to convert an obtained 3D scene model into a panoramic image suitable for the projecting unit and the receiving unit, and project the panoramic plane image onto the receiving unit through the projecting unit. The image processing unit applies the panorama presentation method according to the present invention.

The panorama presentation method according to the present invention may also be applied to a computer readable storage medium, having a computer program stored thereon. When the computer program is executed by a processor, the panoramic presentation method according to the present invention is implemented.

In addition, the present invention may be applied to a landscape sphere. The existing landscape sphere views an image from the outside of the sphere, and the image is a 360° panorama converted by a cylindrical projection method. The upper and lower ends of the sphere are greatly distorted, and may only be applied to entertainment and other occasions with low distortion requirements, and because the image conversion speed is slow, it is generally only possible to convert all the pictures of the video before it is displayed. Even if there are a few pictures that may be displayed in real time, only extremely simple image interaction may be made with people. The application of the landscape sphere of the present invention may reduce image distortion and enhance the ability of the landscape sphere to interact with complex images. It is only necessary to change a front projection screen of the virtual reality device to a rear projection screen of the landscape sphere.

The projection apparatus of the present invention may also be applied to dome-screen halls, experience halls or theaters. Compared with a flat screen and a curved wall screen, the spherical screen 1 covers a much wider field of view, and the picture has no obvious turns and joints. The combination of a single fisheye projector 2 and a complete spherical screen 1 in the present invention may provide a 720° projection environment with better viewing immersion, and may be used as a glass ground venue or a flying theater or an air theater. In the present invention, the specific position of the projector 2 is not required, and the projector 2 only needs to be at the edge of the spherical screen 1 and face the center of sphere. Taking advantage of this feature, the projector 2 may be set up on a curved guide rail to simulate the sun rising in the east and setting in the west. It is only necessary to set the orientation of the virtual camera in the software to be the same as the orientation of the projector 2.

Hence, the present invention presents a panoramic image by using a combined structure of a single fisheye projector and a spherical screen, employs a geometrical relationship between a fisheye lens and the position of a viewer and isometric projection transformation, and enables 180° fisheye projection to present 720° environment information to the viewer in the center of the spherical screen, greatly simplifying the image conversion process and realizing zero distortion, so that the real environment may be restored and the viewer may feel immersive. According to a 720° panorama one-step generation method based on a single virtual camera, complex steps of collecting six images by a plurality of cameras, synthesizing a cube map and then converting the cube map into a panorama are not needed, the vertex position of a scene is directly adjusted in the process from a 3D space to a 2D image, and a final panorama is generated in one step, and the speed is improved by more than 6 times.

The foregoing descriptions are merely preferred embodiments of the present invention, and are not intended to limit the present invention. Any modification, equivalent replacement, improvement and the like made within the spirit and principle of the present invention shall fall within the protection scope of the present invention.

The invention claimed is:

1. A panoramic presentation method, comprising the following steps:
   step S1, building a projection structure;
   the projection structure comprises a projector and a spherical screen, the projector is equipped with a fisheye lens, the projector is disposed on the spherical screen, and the fisheye lens is tangent to the spherical screen and faces a spherical center of the spherical screen;
   step S2, according to a projection formula of the fisheye lens used, such as isometric projection, changing content of projection transformation in virtual reality software, and bringing all scenes of a virtual space into a virtual camera's field of view, so as to generate a 720° panorama, the 720° panorama being a 2D panorama; and
   step S3, projecting the 2D panorama through the fisheye lens, wherein a viewer is located at the spherical center of the spherical screen, and the 2D panorama builds a stereoscopic space on the spherical screen.

2. The panoramic presentation method according to claim 1, wherein in step S2, the changing content of projection transformation comprises adjusting scene coordinates and a projection matrix.

3. The panoramic presentation method according to claim 1, wherein step S2 further comprises: adjusting frustum culling and changing shadow transformation.

4. The panoramic presentation method according to claim 1, wherein an isometric imaging formula is $d=n*\theta$, wherein d is a distance from a position of an object to an image center on a 2D plane image, n is a distance from an imaging plane to the virtual camera, and $\theta$ is an object vector angle, that is, an angle between the z-axis and a line connecting the object and the virtual camera, the z-axis represents the orientation direction of the virtual camera, the virtual camera represents the viewer's eye, and the direction of the virtual camera is the same as the installation direction of the projector.

5. The panoramic presentation method according to claim 2, wherein the adjusting scene coordinates comprises the following steps:

$$x1=x0*\theta*\sec\theta;$$

$$y1=y0*\theta*\sec\theta;$$

$$z1=\sqrt{(x0^2+y0^2+z0^2)};$$

wherein $\theta$ is an object vector angle, that is, an angle between the z-axis and a line connecting the object and the virtual camera, and the z-axis represents the orientation direction of the virtual camera.

6. The panoramic presentation method according to claim 2, wherein the projection matrix is:
   [$1/(\pi*A)$,0,0,0,
   0,$1/\pi$,0,0,
   0,0,$-(f+n)/(f-n)$,$-2*n*f/(f-n)$
   0,0,$-1$,0]
   wherein A is an image aspect ratio of the projector, n is the closest distance between a visible object and the virtual camera, and f is the farthest distance between the visible object and the virtual camera.

7. The panoramic presentation method according to claim 3, wherein the adjusting frustum culling comprises the following steps:
   moving the scene object toward the front of the virtual camera by a distance f for frustum culling; and
   moving the scene object subjected to the frustum culling by the distance f in a direction towards the virtual camera;
   f is the farthest distance between the visible object and the virtual camera.

8. The panoramic presentation method according to claim 3, wherein the shadow transformation adjusts the scene coordinates according to the steps of claim 5, so as to generate a shadow.

9. A panoramic presentation apparatus, comprising:
   a receiving unit, comprising a spherical screen;
   a projecting unit, comprising a projector equipped with a fisheye lens, the projector being located at the edge of the spherical screen and the fisheye lens directly facing a spherical center of the spherical screen; and
   an image processing unit, configured to convert an obtained 3D scene model into a panoramic 2D image suitable for the projecting unit and the receiving unit in real time, and project the panoramic 2D image onto the receiving unit through the projecting unit, wherein the image processing unit applies the panorama presentation method according to claim 1.

10. A non-transitory computer readable storage medium, having a computer program stored thereon, wherein when the computer program is executed by a processor, a panoramic presentation method comprising the following steps:
    step S1, building a projection structure;
    the projection structure comprises a projector and a spherical screen, the projector is equipped with a fisheye lens, the projector is disposed on the spherical screen, and the fisheye lens is tangent to the spherical screen and faces a spherical center of the spherical screen;
    step S2, according to a projection formula of the fisheye lens used, such as isometric projection, changing content of projection transformation in virtual reality software, and bringing all scenes of a virtual space into a virtual camera's field of view, so as to generate a 720° panorama, the 720° panorama being a 2D panorama; and
    step S3, projecting the 2D panorama through the fisheye lens, wherein a viewer is located at the spherical center of the spherical screen, and the 2D panorama builds a stereoscopic space on the spherical screen.

11. The panoramic presentation method according to claim 2, wherein an isometric imaging formula is $d=n*\theta$, wherein d is a distance from a position of an object to an image center on a 2D plane image, n is a distance from an imaging plane to the virtual camera, and $\theta$ is an object vector angle, that is, an angle between the z-axis and a line connecting the object and the virtual camera, the z-axis represents the orientation direction of the virtual camera, the virtual camera represents the viewer's eye, and the direction of the virtual camera is the same as the installation direction of the projector.

12. The panoramic presentation method according to claim 3, wherein an isometric imaging formula is $d=n*\theta$, wherein d is a distance from a position of an object to an image center on a 2D plane image, n is a distance from an imaging plane to the virtual camera, and $\theta$ is an object vector angle, that is, an angle between the z-axis and a line connecting the object and the virtual camera, the z-axis represents the orientation direction of the virtual camera, the virtual camera represents the viewer's eye, and the direction of the virtual camera is the same as the installation direction of the projector.

13. The apparatus of claim 9, wherein in step S2, the changing content of projection transformation comprises adjusting scene coordinates and the projection matrix.

14. The apparatus of claim 9, wherein step S2 further comprises: adjusting frustum culling and changing shadow transformation.

15. The apparatus of claim 9, wherein an isometric imaging formula is $d=n*\theta$, wherein d is a distance from a position of an object to an image center on a 2D plane image, n is a distance from an imaging plane to the virtual camera, and $\theta$ is an object vector angle, that is, an angle between the z-axis and a line connecting the object and the virtual camera, the z-axis represents the orientation direction of the virtual camera, the virtual camera represents the viewer's eye, and the direction of the virtual camera is the same as the installation direction of the projector.

16. The apparatus of claim 13, wherein the adjusting scene coordinates comprises the following steps:

$x1=x0*\theta*\sec\theta;$ $y1=y0*\theta*\sec\theta;$ $z1=\sqrt{(x0^2+y0^2+z0^2)};$ wherein $\theta$ is an object vector angle, that is, an angle between the z-axis and a line connecting the object and the virtual camera, and the z-axis represents the orientation direction of the virtual camera.

17. The apparatus of claim 13, wherein the projection matrix is:

[$1/(\pi*A)$,0,0,0,
0,$1/\pi$,0,0,
0,0,$-(f+n)/(f-n)$,$-2*n*f/(f-n)$
0,0,$-1$,0]

wherein A is an image aspect ratio of the projector, n is the closest distance between a visible object and the virtual camera, and f is the farthest distance between the visible object and the virtual camera.

18. The apparatus of claim 14, wherein the adjusting frustum culling comprises the following steps:

moving the scene object toward the front of the virtual camera by a distance f for frustum culling; and moving the scene object subjected to the frustum culling by the distance f in a direction towards the virtual camera;

f is the farthest distance between the visible object and the virtual camera.

19. The apparatus of claim 14, wherein the shadow transformation adjusts the scene coordinates according to the steps of claim 5, so as to generate the shadow.

20. The non-transitory computer readable storage medium of claim 10, wherein in step S2, the changing content of projection transformation comprises adjusting scene coordinates and the projection matrix.

* * * * *